United States Patent
Li

(10) Patent No.: US 8,797,865 B2
(45) Date of Patent: Aug. 5, 2014

(54) PROVIDING QUALITY OF SERVICE FOR SUB-FLOWS IN A MULTIPLE GRANTS PER INTERVAL SERVICE FLOW

(75) Inventor: Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 411 days.

(21) Appl. No.: 13/173,352

(22) Filed: Jun. 30, 2011

(65) Prior Publication Data

US 2013/0003545 A1  Jan. 3, 2013

(51) Int. Cl.
*H04J 3/24* (2006.01)
(52) U.S. Cl.
USPC .............. 370/230.1; 370/401; 370/412
(58) Field of Classification Search
USPC ................................ 370/230, 401
See application file for complete search history.

(56) References Cited

U.S. PATENT DOCUMENTS

| | | | |
|---|---|---|---|
| 8,018,955 B2 * | 9/2011 | Agarwal et al. | 370/401 |
| 2003/0169751 A1 * | 9/2003 | Pulkka et al. | 370/401 |
| 2004/0063497 A1 * | 4/2004 | Gould | 463/42 |

* cited by examiner

*Primary Examiner* — Mark Rinehart
*Assistant Examiner* — Matthew Hopkins
(74) *Attorney, Agent, or Firm* — Sterne, Kessler, Goldstein & Fox PLLC

(57) ABSTRACT

A method and system to provide Quality of Service (QoS) for packet transmission in a grant of a multiple grants per interval (MGI) service flow is provided herein. The method includes the steps of receiving a packet of an application session, determining characteristics associated with the packet and mapping the packet to a MGI sub-flow, wherein the MGI sub-flow is associated with the QoS attributes for the application session. The method further includes the steps of storing the packet in a pre-shaper sub-flow queue that is associated with the MGI sub-flow that the packet is mapped to, and enforcing the QoS for the packet transmission by adjusting the egress of the packet from the queue based on the QoS attributes associated with the MGI sub-flow.

17 Claims, 6 Drawing Sheets

US 8,797,865 B2

PROVIDING QUALITY OF SERVICE FOR SUB-FLOWS IN A MULTIPLE GRANTS PER INTERVAL SERVICE FLOW

FIELD OF THE INVENTION

This application generally relates to multiple grants per interval (MGI) service flows.

BACKGROUND ART

In communication systems such as Data Over Cable Service Interface Specification (DOCSIS), packets are transmitted from a source, such as an application session that generated the packet, to a destination, such as network equipment, over a DOCSIS network. In an example, the packets are transmitted using MGI service flows. However, current systems do not provide a mechanism providing QoS for individual sub-flows within a MGI service flow.

Methods and systems are needed to overcome the above mentioned deficiency

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 5:
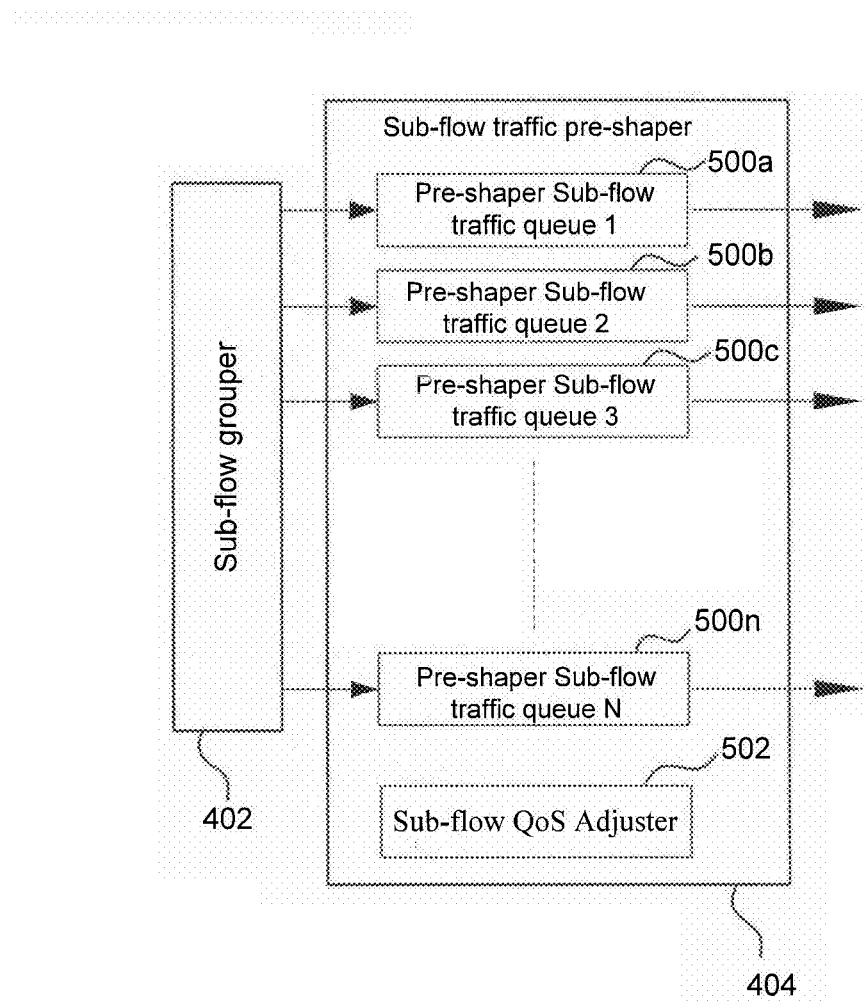

FIG. 5 further illustrates a sub-flow traffic shaper according to an embodiment of the invention.

Figure 6:
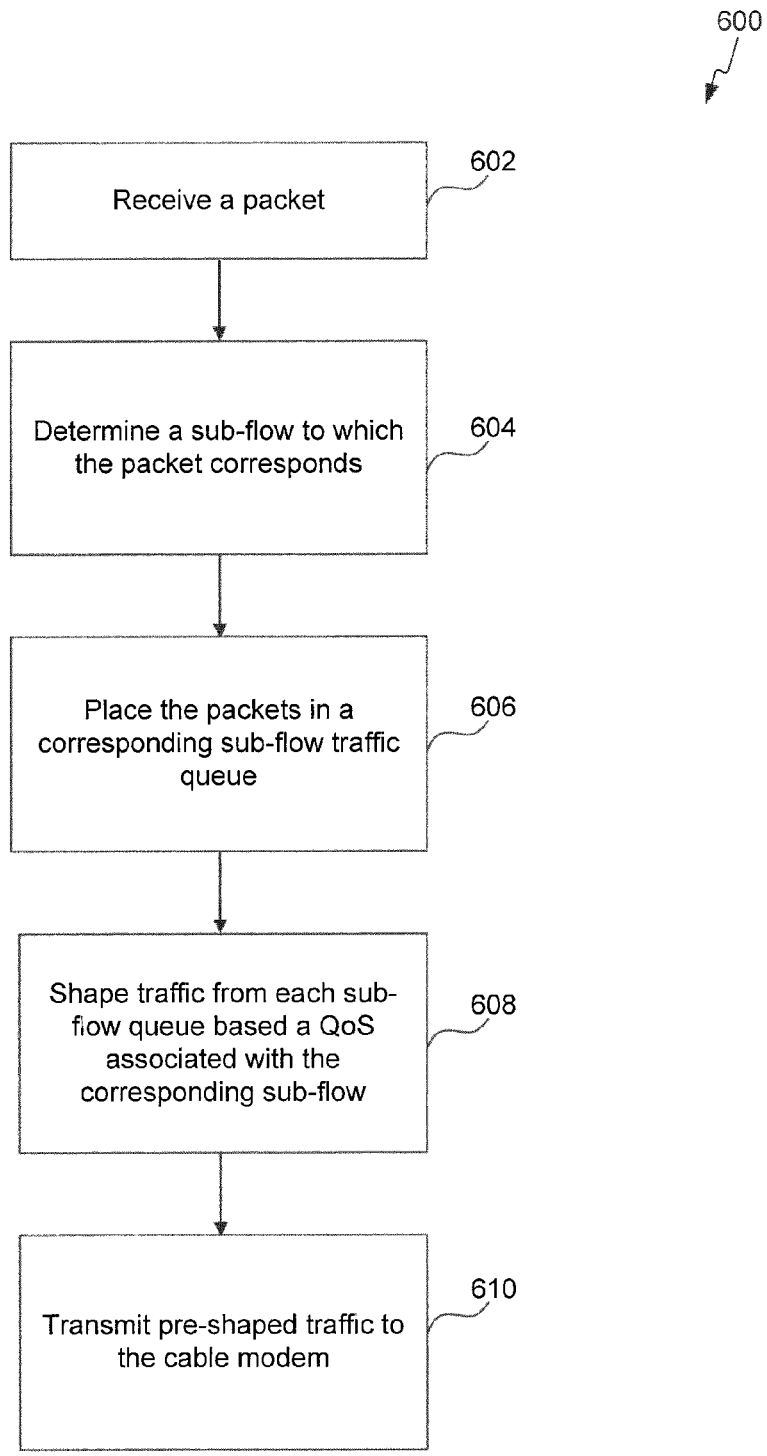

FIG. 6 shows an example flowchart illustrating steps performed to provide quality of service for a sub-flow in an MGI service flow according to an embodiment of the invention The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Quality of Service (QoS) is a critical factor that impacts real-time applications such as voice-over-IP (VoIP) and video conferencing. As the use of such applications becomes widespread, it becomes difficult to guarantee QoS for each application session. Guaranteeing QoS for each application session is especially difficult if the QoS resources available on the access network are limited. One such example of an access network is based on the Data Over Cable Service Interface Specification (DOCSIS). QoS on a DOCSIS access link is realized by classifying traffic into different Service Flows (SF) that are associated with certain QoS parameters. For instance, in DOCSIS systems, packets for a VoIP call session are transmitted on an Unsolicited Grant Service (UGS) service flow that is associated with QoS parameters that guarantee a predetermined amount of bandwidth and periodic transmission opportunities for the call session.

The maximum number of service flows supported by a DOCSIS cable modem (CM) and a DOCSIS cable modem termination system (CMTS) is usually limited by the hardware and computational resources of the CM and CMTS. If one service flow is assigned to serve one VoIP call, then the maximum number of simultaneous VoIP call sessions supported by the CM is limited by the maximum number of service flows supported by the CM and the CMTS. For example, if the CM and CMTS can support 16 service flows at a time, then up to 16 simultaneous VoIP sessions may be supported. This limitation restricts the number of simultaneous application sessions that can be supported by the CM and CMTS. In particular, when the CM is deployed in an enterprise environment where the density of simultaneous VoIP calls is relatively high (e.g. over 100), the QoS for the each VoIP call may not be guaranteed since the simultaneous VoIP call sessions may not be allocated to dedicated SFs over a DOCSIS link.

Using a Multiple Grants per Interval (MGI) service flow, a CMTS can allocate multiple grants (also known as "transmission opportunities") on a given grant interval (also known as a "transmission interval"). This potentially allows multiple applications sessions (e.g. VoIP calls) to be carried in a single service flow, and thus allows for QoS support for a number of application sessions that is greater than the maximum number of available service flows. One of the problems associated with MGI service flows is that DOCSIS provides QoS for a MGI service flow as a whole and not for individual sub-flows within a MGI service flow. Embodiments presented herein and described further below, provide a mechanism that provides QoS for individual sub-flows within a MGI service flow.

Figure 1:
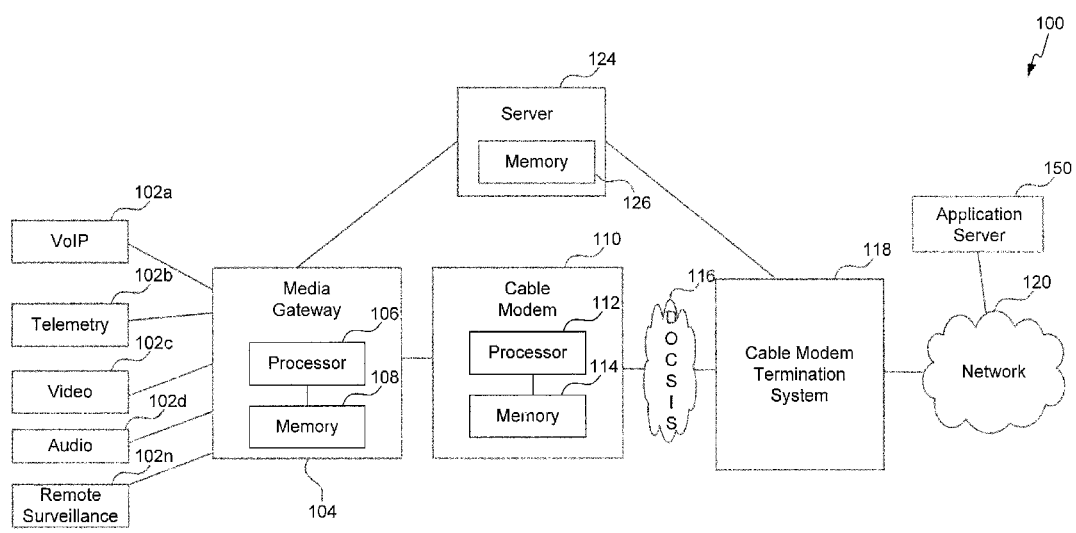
FIG. 1 illustrates an example communication system according to an embodiment of the invention.

FIG. 1 illustrates an example communication system 100 according to an embodiment of the invention. System 100 includes media sources 102*a*-*n*, media gateway 104, cable modem 110, DOCSIS network 116, cable modem termination system 118, network equipment 122, network 120, server 124 and application server 150.

Media gateway 104 is coupled to media sources 102, cable modem 110 and server 124. Media sources may include, but are not limited to, Voice over Internet Protocol (VoIP) 102*a*, telemetry 102*b*, video 102*c*, audio 102*d*, remote surveillance 102*n* etc. Cable modem 110 is coupled to cable modem termination system 118 via DOCSIS network 116. Cable modem termination system 118 is coupled to network 120 and to network equipment 122.

Media gateway 104 includes a processor 106 coupled to a memory 108. Processor 106 based on instructions stored in memory 108 may perform the functions described herein as being performed by media gateway 104. Cable modem 110 includes a processor 112 coupled to a memory 114. Processor 112, based on instructions stored in memory 114, may perform the functions described herein as being performed by cable modem 110.

In an embodiment, media gateway 104 may be, for example, a router. In another embodiment, media gateway 104 may be integrated with cable modem 110 and the functions described herein as being performed by cable modem 110 may be performed by cable modem 110 that is integrated with media gateway 104. Server 124 includes a memory 126 and is coupled to media gateway 104, cable modem termination system 1118, network 120 and network equipment 122. Application server 150 controls and manages different applications according to their respective protocols. For example, if application server 150 is a Session Initiation Protocol (SIP) application server, then it runs a SIP protocol to manage applications.

Each media source 102 includes an application client (not shown) that may generate and run one or more application sessions, each of which generates packets or frames that are transmitted by media gateway 104 to cable modem 110 and over DOCSIS network 116 to CMTS 118. For example, VoIP 102a may include multiple Internet Protocol (IP) phones (not shown), with each IP phone generating a corresponding VoIP application session and each VoIP application session generating corresponding packets that are transmitted to cable modem 110. Cable modem 110 classifies the packets according to DOCSIS classification rules and transmits the packets to CMTS 118 over DOCSIS network 116.

Figure 2:
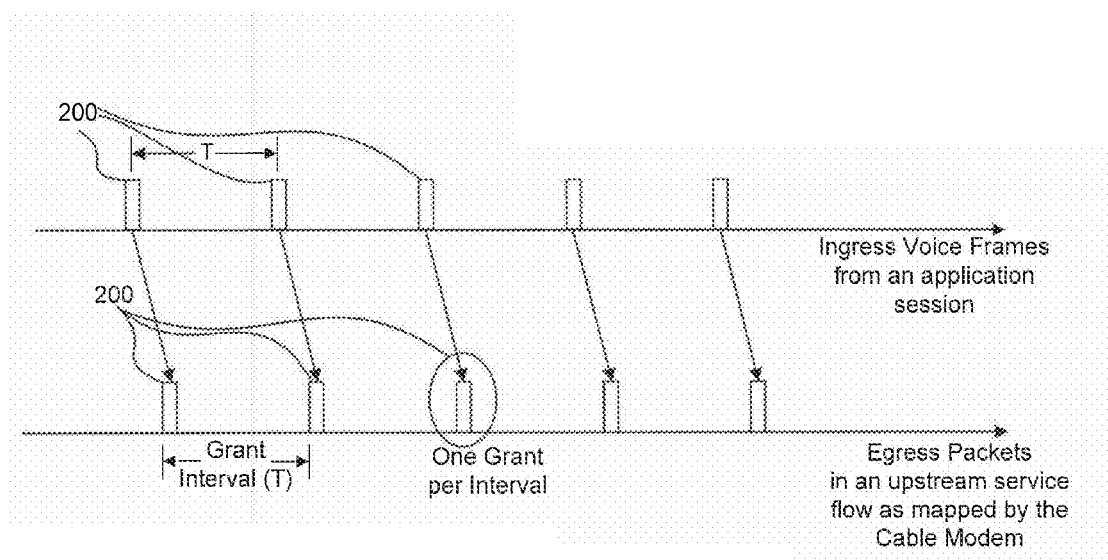
FIG. 2 shows an example implementation of a single grant per interval according to an embodiment of the invention.

FIG. 2 shows an example implementation of a single grant per interval. In conventional systems, to guarantee quality of service (QoS), each packet 200, received by media gateway 104, corresponding to a particular application session, e.g. an incoming voice call, is transmitted by cable modem 110 in a single grant interval (T) of a unique service flow (SF) that has the required QoS attributes, e.g. guaranteed bandwidth and delay/jitter that allows periodic voice packets to be transmitted in corresponding periodic grants. In a single grant per interval implementation, as shown in FIG. 2, each packet 200 received by cable modem 110 is mapped to a single transmit opportunity allocated for the upstream service flow; that is, each packet 200 is transmitted in a single grant per grant interval (T). In this example, there is a single flow per grant interval and DOCSIS provides a mechanism that provides QoS for packets transmitted on the single service flow.

Figure 3:
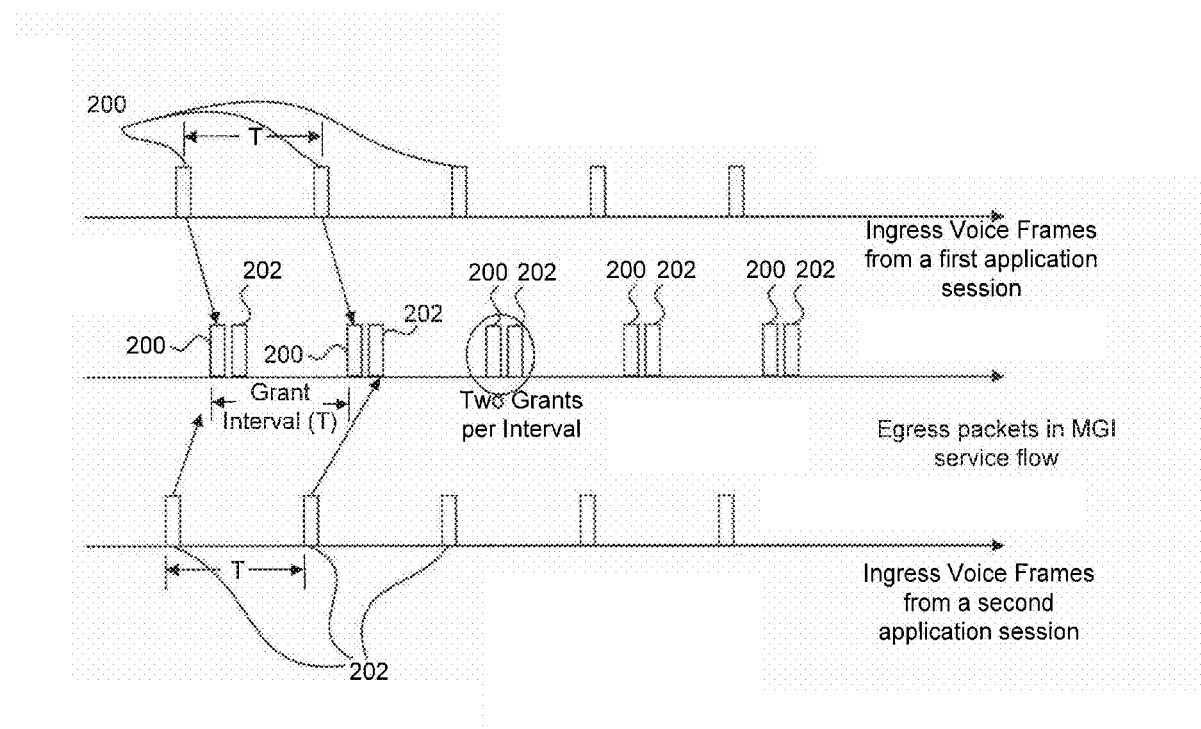
FIG. 3 illustrates an example implementation of multiple grants per interval according to an embodiment of the invention.

FIG. 3 illustrates an example implementation of multiple grants per interval according to an embodiment of the invention.

Multiple grants per interval service flows may be utilized when cable modem 110 receives packets from multiple simultaneous application sessions for transmission to CMTS 118. The multiple application sessions may originate from one or more of media sources 102. For example, VoIP 102a may generate multiple simultaneous VoIP call sessions. In an MGI service flow, CMTS 118 allocates multiple grants or transmit opportunities per interval. This allows cable modem 110 to transmit multiple packets from multiple application sessions during a single grant interval T.

In the example shown in FIG. 3, packets from multiple flows having differing QoS requirements may be transmitted in "MGI sub-flows" (also referred to as "sub-flows" herein) during a grant interval T. MGI sub-flows, as referred to herein, refer to the individual grants within an MGI service flow. For example, as seen in FIG. 3, packets 200 that are transmitted in the first grant comprise a first sub-flow. Similarly, packets 202 which are transmitted in the second grant in the same grant interval T are part of a second sub-flow. In conventional systems, there is no mechanism to adjust quality of service for each sub-flow of an MGI service flow. For example, in conventional systems, cable modem 110 adjusts a quality of service for an entire MGI service flow and not for individual sub-flows. Thus, all sub-flows in a MGI service flow will be collectively subjected to the aggregate quality of service associated with the overall MGI service flow, regardless of the individual QoS requirement of each constituent sub-flow. For example, packets 200 and packets 202 will be collectively subjected to the aggregate quality of service of the overall MGI service flow. Subjecting all sub-flows in the MGI service flow to an aggregate QoS may be undesirable. For example, packets 200 may correspond to a sub-flow that has a QoS requiring a rate limit of 0.35 Megabits per second (Mbps). Packets 202 may correspond to a sub-flow that has a QoS requiring a rate limit of 0.15 Mbps. The MGI service flow to which packets 200 and 202 are mapped to may provide a rate limit of 0.5 Mbps. In this case, currently available mechanisms limit the aggregate rate of packets 200 and 202 to 0.5 Mbps. For example, current mechanisms may limit rate of packets 200 to 0.25 Mbps and a rate of packets 202 to 0.25 Mbps for an aggregate total of 0.5 Mbps. In this case, the rate limit for packets 200 is too low and the rate limit for packets 202 is too high. Embodiments of the invention presented herein provide a system, method and computer program product to provide QoS for individual sub-flows in a MGI service flow.

Figure 4:
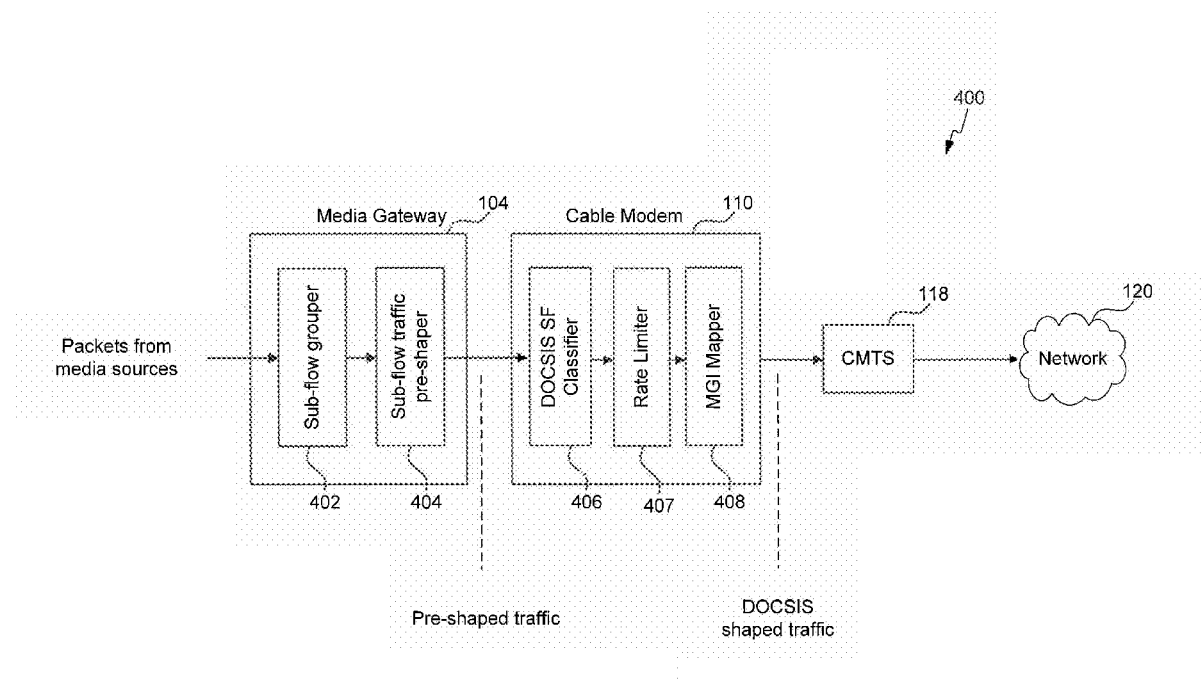
FIG. 4 illustrates an example system that provides QoS for individual sub-flows in a MGI service flow according to an embodiment of the invention.

FIG. 4 illustrates an example system 400 that provides QoS for individual sub-flows in a MGI service flow, according to an embodiment of the invention.

Media gateway 104 may include, sub-flow grouper 402 coupled to a sub-flow traffic pre-shaper 404. Cable modem 110 may include a DOCSIS service flow (SF) classifier 406 coupled to a rate limiter 407. Rate limiter 407 is coupled to MGI mapper 408. In an embodiment, sub-flow grouper 402, sub-flow traffic pre-shaper 404, DOCSIS service flow (SF) classifier 406, rate limiter 407 and MGI mapper 408 are implemented solely in hardware. In another embodiment, sub-flow grouper 402, sub-flow traffic pre-shaper 404, DOCSIS service flow (SF) classifier 406, rate limiter 407 and MGI mapper 408 are implemented in software. For example, sub-flow grouper 402 and sub-flow traffic pre-shaper 404 may be implemented as software running on processor 106 based on instructions stored in memory 108. DOCSIS service flow (SF) classifier 406, rate limiter 407 and MGI mapper 408 may be implemented as software running on processor 112 based on instructions stored in memory 114. In another embodiment, sub-flow grouper 402, sub-flow traffic pre-shaper 404, DOCSIS service flow (SF) classifier 406, rate limiter 407 and MGI mapper 408 are implemented as a combination of hardware and software.

According to an embodiment of the invention, sub-flow grouper 402 maps incoming packets to a sub-flow based on characteristics associated with the packet. For example, sub-flow grouper 402 based on packet characteristics and/or mapping rules stored in memory 104 or memory 108 of media gateway 104 maps the packet to a sub-flow that has certain QoS attributes. In an example, the QoS attributes associated with a sub flow are one or more of Data Over Cable Service Interface Specification (DOCSIS) parameters of bit rate, delay, jitter, maximum burst rate or level of priority. In another example, sub-flow grouper 402 monitors control messages between application client that is within media source 102 (not shown) and application server 150 to determine which packets correspond to which application sessions. Based on the determined application session, sub-flow grouper maps incoming packets to a corresponding sub flow that represents the quality of service for the application session that generated the packet.

According to an embodiment of the invention, sub-flow grouper 402 determines a sub flow for a packet received from a media source 102 based on packet mapping rules. The mapping rules may be pre-programmed or pre-stored by a cable operator in memory 108 of media gateway 104. Alternatively, or in addition to, sub-flow grouper 402 may be aware of application sessions through monitoring of application control messages between the application client that is within media source 102 (not shown) and the application server 150. Monitoring the application control messages provides packet characteristics, including but not limited to the source address and source port number of the packet, the destination address, destination port number of the packet, and other header information of the packet for an established application session. Monitoring the application control messages may also provide QoS characteristics for the packet, including but not limited to, a rate limit, priority level, acceptable jitter, maximum burst rate and delay. In another embodiment, the mapping rules may be stored in memory 126 of server 124 and sub-flow grouper 402 may access the mapping rules to determine which application session is to be associated with a particular packet. Based on the characteristics of the packet, sub-flow grouper 402 maps the packet to a sub-flow corresponding to the application session. The packet is then stored in a pre-shaper sub-flow traffic queue of sub-flow traffic pre-shaper 404 that is described in further detail in FIG. 5.

FIG. 5 further illustrates sub-flow traffic pre-shaper 404 according to an embodiment of the invention. As shown in FIG. 5, sub-flow traffic pre-shaper 404 may include N pre-shaper sub-flow traffic queues 500*a-n*. Each pre-shaper sub-flow traffic queue 500 corresponds to a single sub-flow that is associated with certain QoS attributes. For example, packets having a first set of characteristics are mapped to a pre-shaper sub-flow traffic queue 500 that is associated with certain QoS attributes. Sub-flow traffic pre-shaper 404 also includes a sub-flow QoS adjuster 502. For example, table 1 below illustrates an example mapping of application sessions that have certain packet characteristics to MGI sub-flow ID's and corresponding sub-flow traffic queue ID's.

TABLE 1

| | Packet characteristics | | | | | |
|---|---|---|---|---|---|---|
| Application Session | Source Address | Destination Address | Source Port Number | Destination Port Number | MGI Sub-Flow ID | Pre-Shaper Sub-Flow Traffic Queue ID |
| 1 | 5 | 10 | 11 | 15 | 1 | 1 |
| 2 | 7 | 12 | 15 | 13 | 1 | 1 |
| 3 | 4 | 5 | 6 | 2 | 3 | 3 |
| 4 | 7 | 9 | 6 | 2 | 2 | 2 |

In the exemplary table 1 above, application session 1 may be identified by its packet characteristics such as source address of 5, destination address of 10, source port number of 11 and destination port number of 15. Application session 1 may require a QoS attribute of a rate limit of 0.4 Mbps and a priority level of 4. MGI sub-flow 1 may provide a rate limit of 0.4 Mbps and a priority level of 4. Hence packets from application session 1 are mapped to MGI sub-flow 1 and are stored in pre-shaper sub-flow traffic queue 1 that also has the same QoS attributes as MGI sub-flow 1. Similarly, application session 2, may be identified by its packet characteristics such as source address of 7, destination address of 12, source port number of 15 and destination port number of 13. Application session 2 may only require a QoS attribute of a priority level of 4 and may also be mapped to MGI sub-flow 1 and to pre-shaper sub-flow traffic queue 1. Application session 3 is mapped to MGI sub-flow 3 and sub-flow traffic queue 3 based on its QoS attributes and application session 4 is mapped to MGI sub-flow 2 and pre-shaper sub-flow traffic queue 2 based on its respective QoS attributes.

The sub-flow QoS adjuster 502, based on the QoS attributes with each pre-shaper sub-flow traffic queue 500, adjusts the egress of packets in the queue. For example, pre-shaper sub-flow traffic queue 500*a* may be associated with a rate limit of 0.15 Mbps. Thus, sub-flow QoS adjuster 502 adjusts the rate at which packets exit pre-shaper sub-flow traffic queue 500*a* to a rate limit of 0.15 Mbps. Each pre-shaper sub-flow traffic queue 500 might enforce one or more QoS attributes, including but not limited to, delay, jitter, maximum burst rate and priority level. For example, pre-shaper sub-flow traffic queue 500*c* might be associated with a certain rate limit as well as priority level of packets. Based on the rate limit and priority level associated with pre-shaper sub-flow traffic queue 500*c*, sub-flow QoS adjuster 502 adjusts the egress rate of packets in queue 500*c* relative to egress rates of packets in other queues 500. Thus, media gateway 104 pre-shapes traffic for each sub-flow before sending the packets to cable modem 110.

Referring back to FIG. 4, for each packet received from the media gateway 104, DOCSIS classifier 406 of cable modem 110 performs DOCSIS specified classification procedures to map the packet into a particular MGI service flow.

Rate limiter 407 farther limit the aggregate rate of the packets received from media gateway 104 based on the aggregate data rate limit of the MGI service flow that the packets are mapped to. For example, if a MGI service flow has a rate limit of 0.5 Mbps, the aggregate rate for the sub-flows that are mapped to the MGI service flow is rate limited to 0.5 Mbps. For example, in the example in FIG. 3, packets 200 may correspond to a sub-flow that has a rate limit of 0.35 Mbps and packets 202 may correspond to a sub-flow that has a rate limit of 0.15 Mbps. Sub-flow QoS adjuster 502 in media gateway 104 adjusts the rate for packets 200 to 0.35 Mbps and for packets 202 to 0.15 Mbps. However, the combined rate for packets 200 and 202 is 0.5 Mbps. Rate limiter 407 further slightly adjusts the rate for packets 200 and packets 202 so that the aggregate rate is 0.5 Mbps and the maximum burst rate is within certain limits. If media gateway 104 did not pre-shape traffic according to the embodiments presented herein, then traffic shaper 407 may rate limit packets 200 to 0.25 Mbps and packets 202 to 0.25 Mbps. Thus, even though the rate for packets 200 and 202 might be slightly adjusted by rate limiter 407, by pre-shaping the traffic using media gateway 104, a finer level of QoS support for different sub-flows can still be offered.

For each, sub-flow, MGI mapper 408 schedules the sub-flow in a particular grant within a MGI grant interval. The packets are transmitted in the MGI service flow to cable modem termination system 118.

FIG. 6 illustrates an example flowchart 600 illustrating steps performed to provide quality of service for a sub-flow in an MGI service flow according to an embodiment of the invention.

In step 602, a packet is received. For example, a packet is received by the media gateway 104.

In step 604, the received packet is mapped to a sub-flow based on its characteristics. For example, sub-flow grouper 402 maps a received packet to a sub-flow based on the packet's characteristics such as source Internet Protocol (IP) address, source port number, destination IP address, destination port number, and other header information.

In step 606, the packet is placed in a sub-flow traffic shaper queue based on the sub-flow that the packet is mapped to. For example, packets are placed in a sub-flow traffic queue 500 based on the sub-flow that they are mapped to by the sub-flow grouper 402.

In step 608, traffic from each sub-flow traffic shaper queue is shaped based on the QoS attributes associated with the corresponding sub flow. For example, sub-flow QoS adjuster 502 adjusts an egress of packets for each sub-flow traffic queue 500 based on the corresponding sub flow's QoS attributes such as rate limit, packet delay and jitter, maximum burst rate and priority.

In step 610, the pre-shaped packets are transmitted to the cable modem 110 for DOCSIS classification, rate limiting and MGI mapping. For example, DOCSISS classifier 406 classifies the received packets according to DOCSIS classification rules, rate limit 407 further shapes the received packet, and MGI mapper 406 maps the packet to a grant in a MGI service flow.

Embodiments presented herein, or portions thereof, can be implemented in hardware, firmware, software, and/or combinations thereof. The embodiments presented herein apply to any communication system that utilizes packets for data transmission.

The representative packet processing functions described herein (e.g. functions performed by sub-flow grouper 402 or sub-flow traffic pre-shaper 404 can be implemented in hardware, software, firmware or any combination thereof. For instance, the method of flowchart 600 can be implemented using one or more of computer processors, such as processor 106 or 112, sub-flow grouper 402, sub-flow traffic pre-shaper 404, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the packet processing functions described herein could be embodied by computer program instructions that are executed by a computer processor, for example processor 106 or 112, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as instruction memory 108 and/or 114, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A system to provide Quality of Service (QoS) for transmitting a packet in a grant of a multiple grants per interval (MGI) service flow, comprising:
   a memory; and
   a processor coupled to the memory and configured to, based on instructions in the memory, perform the steps of:
      receiving a packet from an application session;
      determining characteristics associated with the packet;
      mapping the packet to an MGI sub-flow, wherein the MGI sub-flow is associated with QoS attributes required by the application session and wherein the MGI sub-flow is one of a plurality of MGI sub-flows within the MGI service flow;
      storing the packet in a pre-shaper sub-flow traffic queue that is associated with the MGI sub-flow that the packet is mapped to; and
      providing QoS for transmitting the packet by adjusting an egress rate of the packet from the pre-shaper sub-flow traffic queue based on the QoS attributes associated with the MGI sub flow.

2. The system of claim 1, wherein the processor is further configured to:
   determine the characteristics associated with the packet based on one or more of a source address of the packet, a source port number of the packet, a destination address of the packet and a destination port number of the packet.

3. The system of claim 1, wherein the processor is further configured to determine mapping rules based on a table stored in the memory that includes packet characteristics and a corresponding pre-shaper sub-flow traffic queue identifier and wherein the packet characteristics include one or more of source address of the packet, source port number of the packet, destination address of the packet and destination port number of the packet.

4. The system of claim 1, wherein the processor is further configured to determine mapping rules by querying a server or database that includes packet characteristics and a corresponding pre-shaper sub-flow traffic queue identifier, wherein the packet characteristics include one or more of source address of the packet, source port number of the packet, destination address of the packet, destination port number of the packet, and other header information of the packet.

5. The system of claim 1, wherein the QoS attributes associated with the MGI sub-flow are one or more of Data Over Cable Service Interface Specification (DOCSIS) QoS parameters of bit rate, delay, jitter, maximum burst rate and priority level.

6. The system of claim 1, wherein packets from different applications that collectively conform to a set of QoS attributes are mapped to the same pre-shaper sub-flow traffic queue.

7. The system of claim 1, wherein packets from the pre-shaper sub-flow traffic queue are mapped to a single unique grant of an MGI service flow and wherein the MGI service flow has multiple grants per grant interval.

8. The system of claim 1, wherein packets from multiple pre-shaper sub-flow traffic queues are mapped to a single grant of an MGI service flow and wherein the MGI service flow has multiple grants per grant interval.

9. The system of claim 1, wherein the system is a media gateway.

10. The system of claim 1, wherein the system is a media gateway integrated with a cable modem.

11. The system of claim 1, wherein each MGI sub-flow within the MGI service flow has a corresponding different QoS requirement.

12. A computer-based method to provide Quality of Service (QoS) for transmitting a packet in a grant of a multiple grants per interval (MGI) service flow, comprising the steps of:
   receiving a packet from an application session;
   determining characteristics associated with the packet;
   mapping the packet to an MGI sub-flow, wherein the MGI sub-flow is associated with QoS attributes required by the application session and wherein the MGI sub-flow is one of a plurality of MGI sub-flows within the MGI service flow;
   storing the packet in a pre-shaper sub-flow traffic queue that is associated with the MGI sub-flow that the packet is mapped to; and
   providing QoS for transmitting the packet by adjusting an egress rate of the packet from the pre-shaper sub-flow traffic queue based on the QoS attributes associated with the MGI sub flow.

13. The computer-based method of claim 12, wherein the determining step comprises determining the characteristics associated with the packet based on one or more of a source address, a source port number, a destination address and a destination port number of the packet.

14. The computer-based method of claim 12, wherein the mapping step comprises determining mapping rules based on a table stored in a memory that includes packet characteristics and a corresponding pre-shaper sub-flow traffic queue identifier and wherein the packet characteristics include one or more of a source address of the packet, a source port number of the packet, a destination address of the packet and a destination port number of the packet.

15. The computer-based method, of claim 12, wherein the mapping step comprises determining mapping rules by querying a server or database that includes packet characteristics and a corresponding pre-shaper sub-flow traffic queue identifier, wherein the packet characteristics include one or more of a source address of the packet, a source port number of the packet, a destination address of the packet and a destination port number of the packet.

16. The computer-based method of claim 12, wherein characteristics associated with the packet are one of Data Over Cable Service Interface Specification (DOCSIS) QoS parameters of bit rate, delay, jitter, maximum burst rate and priority level.

17. The computer-based method of claim 12, wherein packets from different applications that collectively conform to a set of QoS attributes are mapped to the same pre-shaper sub-flow traffic queue.

* * * * *